June 25, 1957   D. L. WAUGH   2,796,911
METHOD OF MANUFACTURING BELTS
Filed Dec. 5, 1952
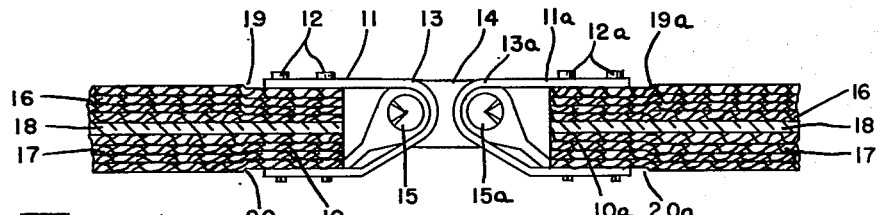
Fig. 1
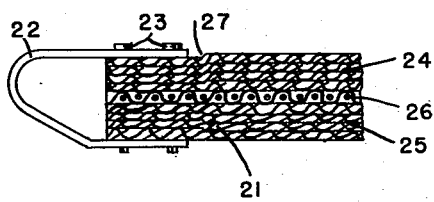
Fig. 2
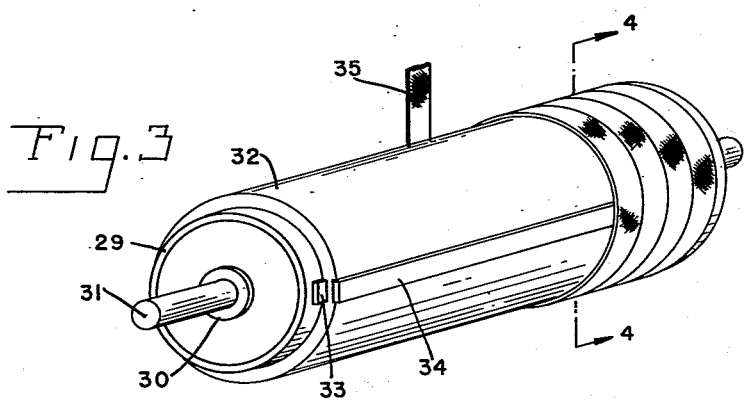
Fig. 3
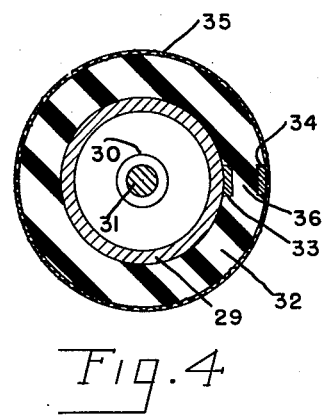
Fig. 4
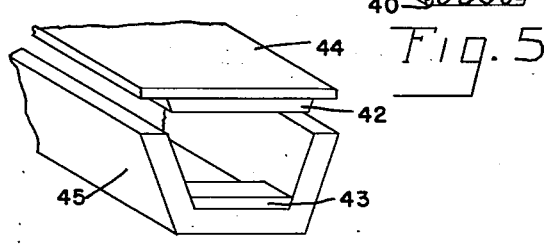
Fig. 5
Fig. 6
INVENTOR.
DALE L. WAUGH
BY
ATT'Y.

United States Patent Office 2,796,911
Patented June 25, 1957

2,796,911

METHOD OF MANUFACTURING BELTS

Dale L. Waugh, Dayton, Ohio, assignor to The Dayton Rubber Company, a corporation of Ohio Application December 5, 1952, Serial No. 324,252

8 Claims. (Cl. 154—4)

The present invention relates to belts and in particular to connector type or non-endless belts.

In the field of belting for either power transmission or conveyor purposes, it often develops that the physical characteristics of the drive or machinery with which the belt is to be used are such that the conventional endless type belts may not be used. On still other power transmission and conveyor drives the belts are so located that the installation and/or removal of the conventional endless belts involves removing a large part of the machinery on which the belt is used with the consequent loss of time and production from the machine. It is in situations and on machinery such as that described above that the connector type belt which forms the subject of this invention finds its utility.

Connector type belts comprise simply a belt body which is not continuous or integrally closed upon itself and is spoken of by those skilled in the art of belting as a non-endless belt, which term is a negative designation that the belt body has ends, as opposed to the conventional circular belt which is endless.

Whereas belts of the connector type are conveniently installed on almost any drive, it is the conventional practice to use them only where the endless type belt cannot be employed. The main reason for this and the chief disadvantage inherent in connector type belts exists in the fact that the link that must be provided to connect the ends of the belt to form the necessary continuous drive member lacks sufficient strength, particularly with regard to its anchorage to the belt itself, to carry the load for which the belt, if of the endless variety, could be designed.

The amount of tension or pull upon a connector belt at which the connector tends to pull away or separate from the belt itself, thus destroying the continuity of the drive, is known as the connector pull-out strength or simply the connector strength of the connector type belt. In the past, in order to achieve the highest possible connector strength, connector type belts have been made of extremely strong material so as to securely anchor the fastening means between the connector and the belt proper. In most connector belt constructions, this factor has resulted in improving the load carrying capacity of the belt body to a point which is far greater than the connector pull-out strength obtained, with the result that the full gain in the load carrying capacity of the belt is lost to the extent of the difference between it and the lower connector strength of the assembled belt and connector combination.

It is accordingly an object of the present invention to provide a connector type belt which is capable of carrying the maximum load consonant with the material of which the belt proper is composed.

Another object of the present invention is to provide a connector type belt which is capable of securely anchoring the belt connector fastening means.

It is still another object of the present invention to provide a connector type belt wherein the difference between the ultimate tensile strength of the belt proper and the connector pull-out strength is at a minimum.

It is yet another object of the present invention to provide a convenient and inexpensive method of manufacturing the belt of the type to be herein disclosed.

These and other objects and advantages to be made apparent I propose to achieve by providing a belt body of rubber and textile material, the connector ends of which, that is, the portions of the belt to be received by and anchored to the connectors, are of a greater density than the remainder of the belt. These connector ends are to be constructed of the same material as is the remainder of the belt, but will be so constructed that the amount of belt material per unit length will be greater at the connector end. This increased density at the ends where the connectors will be anchored not only provides a firmer foundation for the connector fastening means but also allows the greatest amount of belting material necessary to connector strength to be present in the limited space defined by the connector straps or the like.

For the most expedient, economical and satisfactory construction of connector belts of the type considered herein, I propose building a belt sleeve such as is disclosed in U. S. Patent No. 1,591,303 to Freedlander and to compact the same together with a compression strip in axial engagement therewith, and subjecting the compacted combination to vulcanizing heat. Upon removal of the compacting means and the compression strips, individual belts may be formed by cutting circumferentially of the belt sleeve and then further cutting the individual belt thus formed transversely through the compressed area formed on said belts by the compression strip during the vulcanization process. Where a wrapped molded belt according to this invention is desired, the same may be constructed by building, cutting and wrapping the individual belts while in their uncured state and then vulcanizing them in a press mold, the cavities of which have compression plates so arranged as to compress the material at the belt ends.

Having thus briefly described the present invention, I shall now proceed with a more detailed description in connection with which reference may be had to the appended drawing.

In the drawing:

Figure 1 is a vertically sectioned elevational view of a typical belt embodying the features of the present invention and a typical connector in operative engagement therewith.

Figure 2 is a vertically sectioned elevational view of a modification of the belt of Figure 1 to which is fastened a typical connector strap.

Figure 3 is a perspective showing a typical mandrel and belt sleeve built thereon and the manner of compacting said belt sleeve together with typical compression strips.

Figure 4 is a vertical section on line 4—4 of Figure 3.

Figure 5 is a perspective of a wrapped molded belt according to the present invention.

Figure 6 is a perspective of a typical mold for use in manufacturing belts of the type shown in Figure 5.

Referring now to Figure 1, there is shown a connector-type belt constructed in accordance with this invention having connector ends 10 and 10a fastened to connector straps 11 and 11a by nails, rivets, or similar fastening means 12 and 12a. The straps fastened to the belt ends as shown are themselves connected at the loops 13 and 13a by a suitable linking member 14 passing through the strap loops 13 and 13a and pivotally connected with pin or pintle assemblies 15 and 15a held within their respective loops.

The belt itself is composed of a tension section 16 of superimposed layers of rubberized fabric, a neutral axis section 18 comprising one or more layers of helically wound flexible but longitudinally inextensible strength cord, and a compression section 17 of superimposed layers of rubberized fabric.

It is to be noted that at 19, 19a, 20 and 20a, the upper and lower surfaces of the belt in 10 and 10a respectively are indented so as to form the neck portions to be held within the straps 11 and 11a. It should also be noted that the necked portions within the strap members contain the same number of plies of rubberized fabric and layers of strength cord as does the thicker portion of the belt. The portion of the belt within the strap is thus characterized by more than just a reduction in thickness, but includes also an increase in density inasmuch as the same amount of belt material per unit length is compressed to a reduced thickness within the necked portion. As explained above, it is this compressed belting material leading to a more dense and more firm foundation and anchor for the belt connector fasteners such as at 12 and 12a which provides a greater connector pull-out strength and thus provides for an overall stronger belt and connector combination.

The belt and connector strap shown in Figure 2 is a modification of the structure shown in Figure 1 and likewise embodies the features of the present invention. The belt 21 is connected to the connector strap 22 by fastening means 23 similar to the structure illustrated in Figure 1. In this belt, however, while the tension section 24 and compression section 25 are formed of rubberized fabric as is the belt illustrated in Figure 1, the neutral axis section 26 rather than consisting of continuously wound cords is composed of one or more superimposed layers of rubberized square-woven, straight-laid fabric. Fabric is straight laid when it is so arranged in the belt that the warp or woof threads of the fabric extend longitudinally of the belt, while the cross threads lie at right angles thereto. In the belt of Figure 2 and that of Figure 1, the rubberized fabric forming the tension and compression sections may be either straight or bias laid. Because of the greater extensibility of the latter, however, the bias-laid fabric wherein the warp and woof threads extend diagonally of the longitudinal axis of the belt, is preferred in these sections. In the belt 21 only the upper surface is indented at 27 to give the desired compression and reduction in size of the necked portion to fit within strap 22. In this, as in the previously described belt, the same desired increased density and firm anchorage is provided by forcing the belt material to a reduced thickness. It is to be noted that the linearity and thickness of the neutral axis materials 18 and 26 are relatively unaffected by the compression and reduction in thickness at the belt ends. This is due to the fact that the compression is taken up by the more compressible rubberized fabric without affecting the planar relationship of the neutral axis layer.

In addition to the fabric and cord construction outlined above, it is to be understood that the belts of the present invention may be constructed of any textile, metallic or rubber composition suitable for the well-known types of belting. In all such modified constructions, however, and in particular with regard to constructions employing rubber composition containing little or no textile material, care should be taken to control the flow of said material so that the desired compression will be achieved. Since the rubber-like material is relatively incompressible and becomes fluid upon subjection to vulcanizing temperatures, the rubber will tend to flow instead of being compressed; and the major increase in density will tend to be confined to the effect of the compression of the textile material which may be either in the form of fabric or fibers. In this regard, the rubberized fabric constructions described are preferred for this type of belt in that the flow of the belting material is more easily and completely controlled; and, as is well known in the art of belting, the fabric construction in and of itself provides a better anchoring foundation for the connector fastening means. If, however, it is desired to apply the principles of this invention to a belt essentially of a rubber composition, the flow and compressibility may be sufficiently restricted by well known compounding expedients or by partially curing the rubber-like material before compressing and finally vulcanizing it.

Referring now to Figures 3 and 4 and to the method of constructing the connector belt of the type above described, a typical belt mandrel or drum 29 is shown mounted at bearing 30 on the rotatable shaft 31. About this rotatable mandrel 29 the belt sleeve 32 is built according to the previously mentioned Freedlander patent and similar methods related thereto. While the construction of this belt sleeve may correspond to either of the belt constructions illustrated above, or to the modifications described, it is shown, for the sake of clarity, as being composed solely of a rubber composition. The compression strips 33 and 34 which may be composed of metal, wood, or similar incompressible substances are axially aligned along the surfaces of the belt sleeve 32 as shown. The inner compression strip 33 must, of course, be fixed along the mandrel before the sleeve 32 is built thereon, whereas the outer compression strip 34 should be placed along the outer surface of the sleeve before the rag wrapper 35 or other compacting means are applied. As best shown in Figure 4 the compression strips 33 and 34 so engage the belt sleeve that upon the application of the compacting means such as the rag wrapper 35 the material of the belt sleeve will be compressed, as shown at 36 in Figure 4. The sleeve thus compacted and further compressed and while still on the building mandrel 29 is subjected to vulcanizing heat so as to integrate the components of the belt sleeve and to fix the state of increased density and reduced thickness of the portion 36. After this vulcanization, the compacting medium 35 is removed as are the compression strips 33 and 34, after which individual annular belts are formed by cutting circumferentially of the sleeve. The belts at this stage are, of course, of the endless variety having the necked down portion 36. To form the connector or non-endless variety of the present invention the individual endless belts are simply cut transversely through the compressed portion of reduced thickness 36.

Depending upon the actual compression desired and whether one or two surfaces of the belt are to be indented, such as at 19 and 20 of Figure 1 or 27 of Figure 2, either one or both of the compression strips 33 and 34 may be used. Where the inner compression strip 33 is employed, the same may, of course, be left in engagement with the mandrel and the belt sleeve until after the individual belts are cut and removed therefrom. By correlating the illustration of the necked down portion of 36 of Figure 4 with the portion of the belt 10 within the strap 11 and portion 10a within strap 11 in Figure 1, it can be seen how severing the individual annular belt transversely through the necked down portion 36 of Figure 4 provides a non-endless belt with two compressed portions of reduced thickness adapted to fit within the spaced ends of a typical belt connector strap such as shown at 11 and 11a of Figure 1.

Figures 5 and 6 refer to the application of the features of this invention to a wrapped molded type belt which in the typical construction illustrated in Figure 5 consists of a tension section 37 of superimposed layers of rubberized bias fabric, a strength section 38 of superimposed layers of straight-laid fabric, a compression section 39 of layers of bias rubberized fabric, and a rubberized fabric cover 40 encasing the whole. According to the present invention, this belt has the compressed connector end portions 41 and 41a. This type of belt may be constructed by a method similar to that set forth in Patent No. 2,034,466 to Freedlander which involves building and cutting individual belt cores from an unvulcanized belt sleeve, wrapping the cores thus formed and vulcanizing the wrapped belts in individual molds as opposed to vulcanizing the entire belt sleeve as previously described. In order to gain the increased density at the belt ends according to this invention, compression plates 42 and 43 may be provided as shown within the individual vulcanizing and molding cavity formed by top plate 44 and the belt receiving member 45. When these members become the top and bottom platens respectively of a curing press or are otherwise forced into surrounding engagement with a belt, the compression plates 42 and 43 will cause a greater compression at the belt ends during the vulcanization thereby fixing the desired increased density of the material in those portions of the belt at which the connectors will be anchored. Once again it is apparent that, where less compression at the belt ends is desired, either of plates 42 or 43 may be omitted.

Although the features of the present invention have been particularized in considerable detail, it is to be understood that the description, illustration and embodiment referred to above are solely for descriptive purposes and are in no way intended to limit the scope of the principles of this invention as more particularly defined in the subjoined claims.

I claim:

1. In the method of manufacturing belts of the type described, the steps of building a belt sleeve about a suitable mandrel having an inner compression strip lying thereon and axially thereof, placing a second outer compression strip axially of said mandrel along the outside of said belt sleeve and radially opposite said inner compression strip, compacting the belt sleeve and compression strips thus arranged, subjecting the compacted sleeve to vulcanizing heat, cutting circumferentially of the vulcanized sleeve to form individual circular belts, and cutting transversely of the individual belts at the compressed area formed by said compression strips.

2. In the method of manufacturing belts of the type described, the steps of building a belt sleeve about a suitable mandrel, placing thereon and axially thereof a compression strip, compacting the belt sleeve and compression strip thus arranged, subjecting the compacted sleeve to vulcanizing heat, cutting circumferentially of the sleeve to form individual endless belts and cutting transversely through the individual belts at the depression formed by the compression strip.

3. In the method of manufacturing belts of the type described, the steps of placing a compression strip axially along the surface of a suitable mandrel, building a belt sleeve about said mandrel and compression strip, compacting the belt sleeve and compression strip, subjecting the compacted combination to vulcanizing heat, cutting circumferentially of the sleeve to form individual endless belts and cutting transversely through the individual belts at the depression formed by said compression strip.

4. In the method of manufacturing belts of the type described, the steps of building a belt sleeve about a suitable mandrel, compacting said sleeve together with a compression strip in axial engagement therewith, subjecting the compacted sleeve to vulcanizing heat, cutting circumferentially of the vulcanized sleeve to form individual circular belts and cutting transversely through the individual belts at the depressed area formed by said compression strips.

5. A method according to claim 4 wherein said belt sleeve is built by winding about said mandrel a plurality of plies of rubberized fabric, at least one layer of continuous helically wound strength cord and a plurality of plies of rubberized fabric above said layers of strength cord.

6. A method according to claim 5 wherein said rubberized fabric is cut on the bias.

7. A method according to claim 4 wherein said belt sleeve is built by winding successive layers of rubberized fabric about the mandrel.

8. A method according to claim 7 wherein the fabric layers wound about the intermediate neutral axis section of the belt are cut parallel to the threads of the fabric.

References Cited in the file of this patent

UNITED STATES PATENTS

| Number | Name | Date |
|---|---|---|
| 1,591,303 | Freedlander | July 6, 1926 |
| 2,021,356 | Freedlander | Nov. 19, 1935 |
| 2,028,398 | Kremer | Jan. 21, 1936 |
| 2,073,668 | Wilson | Mar. 16, 1937 |
| 2,118,750 | Welsh | May 24, 1938 |
| 2,186,286 | Engler et al. | Jan. 9, 1940 |
| 2,322,967 | Perry | June 29, 1943 |
| 2,354,062 | Ritzert | July 18, 1944 |
| 2,446,311 | Traxler | Aug. 3, 1948 |
| 2,690,820 | Raes | Oct. 5, 1954 |